March 25, 1952     C. F. LOASBY     2,590,631
DOG BED
Filed Sept. 15, 1948
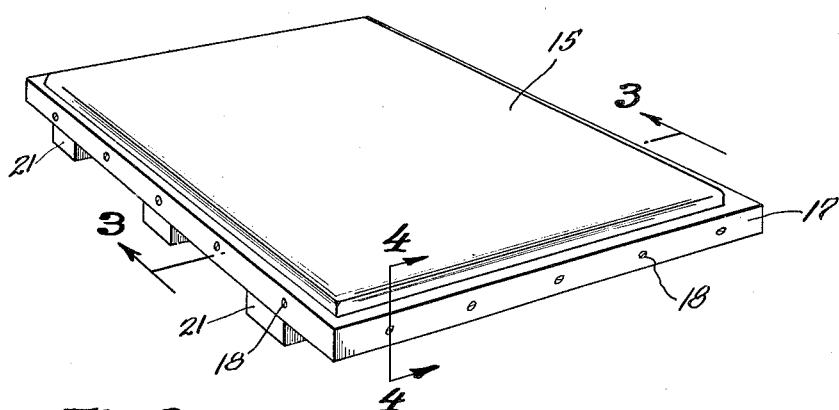
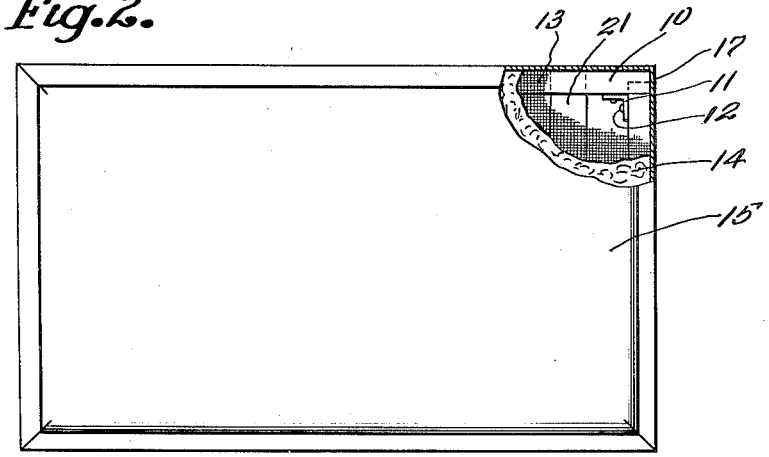
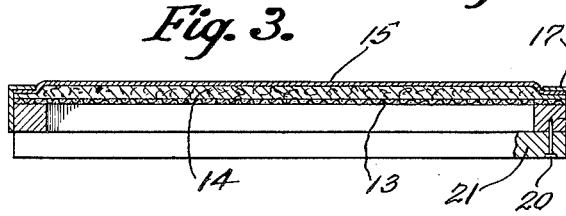
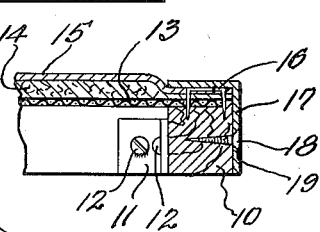
INVENTOR.
Charles F. Loasby
BY
ATTORNEY Patented Mar. 25, 1952

2,590,631

UNITED STATES PATENT OFFICE 2,590,631

DOG BED

Charles F. Loasby, Ridgewood, N. J.

Application September 15, 1948, Serial No. 49,420

1 Claim. (Cl. 5—189)

This invention relates to a bed or rest for dogs to sleep on.

The object of the invention is to provide a dog bed which is comfortable and healthful for the dog to sleep on.

Another object of the invention is to provide a dog bed which is sturdy, sanitary, convenient to handle, and attractive in the home.

A further object of the invention is to provide a dog bed which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a perspective view of the dog bed according to the present invention;

Figure 2 is a top plan view of the dog bed with parts broken away and parts in section;

Figure 3 is a sectional view taken on the line 3—3 of Figure 1;

Figure 4 is an enlarged sectional view taken on the line 4—4 of Figure 1.

Referring in detail to the drawings, the dog bed comprises a frame 10 fabricated of wood or other suitable material. The meeting ends of frame 10 are reinforced by means of angle irons 11 which are secured to the frame by screws 12. A reticulated member embodying a wire screen 13 is arranged across the top of the frame 10 and the screen 13 acts as a spring and support for a resilient body of under carpet padding 14. A cover 15 fabricated of a sturdy piece of carpeting is arranged across the top of the under carpet padding 14. The screen 13, padding 14 and cover 15 are secured to the top of the frame 10 by suitable carpet staples 16, Figure 4. A chromium nozing or edging strip 17 covers the side of the frame and extends over the edge of the cover 15 to prevent the dog from biting and tearing the edge of the cover. A plurality of screws 18 project through countersunk holes 19 in the edging strip 17 for securing the latter to the side of the frame.

Arranged across the bottom of the frame 10 and secured thereto by suitable nails 20 is a plurality of spaced, parallel slats 21 which permit air to circulate beneath the bed, and also prevent the wire screen 13 from scratching the floor.

In use, the above-described bed provides a place for a dog to sleep which will not be in direct contact with the floor. The bed is comfortable, sturdy, sanitary, convenient to handle and attractive in the home. Since the bed is raised off the floor by means of the slats 21, air can circulate therebeneath. Further, the cover 15 is fabricated of sturdy carpeting, and if soiled can easily be cleaned.

As many embodiments may be made of this inventive concept, and as many modifications may be made in the embodiment hereinbefore shown and described, it is to be understood that all matter herein is to be interpreted merely as illustrative and not in a limiting sense.

I claim:

A dog bed comprising a flat open rectangular frame, a flat sheet of a flexible material, such as wire screen, covering the top side of the frame, a layer of padding material overlying said sheet, a covering sheet of relatively soft material, such as a carpet overlying the padding material, fastening means securing the edges of the superimposed materials to the frame, a trim strip, of inverted L-angle form in cross-section, bounding the outer sides of the frame and overlying the said edges of the materials, means securing said strip to the outer sides of the frame, and spaced transversely disposed supporting slats secured on the under side of the frame.

CHARLES F. LOASBY.

REFERENCES CITED

The following references are of record in the file of this patent:

UNITED STATES PATENTS

| Number | Name | Date |
|---|---|---|
| 71,067 | Royse | Nov. 19, 1867 |
| 160,643 | Brown | Mar. 9, 1875 |
| 662,647 | Howe | Nov. 27, 1900 |
| 896,982 | Flindall | Aug. 25, 1908 |
| 1,800,097 | Nuberg | Apr. 7, 1931 |
| 1,802,280 | Schmitt | Apr. 21, 1931 |
| 1,856,323 | Feaster | May 3, 1932 |
| 1,975,622 | Schermerhorn | Oct. 2, 1934 |

FOREIGN PATENTS

| Number | Country | Date |
|---|---|---|
| 164,905 | Great Britain | June 23, 1921 |